(12) United States Patent
Palmer et al.

(10) Patent No.: US 7,600,427 B2
(45) Date of Patent: Oct. 13, 2009

(54) GAGE ENCLOSURE WITH COVER REMOVAL MECHANISM

(75) Inventors: Brian Lee Palmer, Michigan City, IN (US); Michael A. Popp, LaPorte, IN (US)

(73) Assignee: Dwyer Instruments, Inc., Michigan City, IN (US)

( * ) Notice: Subject to any disclaimer, the term of this patent is extended or adjusted under 35 U.S.C. 154(b) by 125 days.

(21) Appl. No.: 11/851,515

(22) Filed: Sep. 7, 2007

(65) Prior Publication Data
US 2009/0064921 A1   Mar. 12, 2009

(51) Int. Cl.
*G01D 11/24* (2006.01)
*B65D 41/06* (2006.01)

(52) U.S. Cl. .................. 73/431; 220/298; 220/300; 220/301

(58) Field of Classification Search .............. 73/431, 73/432.1, 866.3; 220/660, 661, 662, 663, 220/664, 665, 682–691, 298, 300, 301
See application file for complete search history.

(56) References Cited

U.S. PATENT DOCUMENTS

| | | | |
|---|---|---|---|
| 1,750,601 A | | 3/1930 | Keeney |
| 1,919,213 A * | | 7/1933 | Emens ................. 220/300 |
| 2,005,792 A * | | 6/1935 | Leins ................. 126/39 R |
| 2,402,360 A * | | 6/1946 | Bevins ................. 220/664 |
| 2,745,275 A | | 5/1956 | Jacobi |
| 2,895,637 A * | | 7/1959 | Bakke et al. ........... 220/302 |
| 2,906,863 A * | | 9/1959 | Ritter ................. 362/267 |
| 3,001,668 A * | | 9/1961 | Charbonneaux et al. .... 220/664 |
| 3,166,941 A * | | 1/1965 | Waite et al. ............ 73/431 |
| 3,439,543 A * | | 4/1969 | Aldeborgh .............. 73/431 |
| 3,510,196 A | | 5/1970 | Beer et al. |
| 3,628,096 A * | | 12/1971 | Drew et al. ............ 361/664 |
| 3,744,748 A | | 7/1973 | Harrold |
| 3,943,441 A * | | 3/1976 | Shackford ............. 324/110 |
| 4,053,082 A * | | 10/1977 | Ullman ................ 220/3.6 |
| 4,081,102 A * | | 3/1978 | Sakai ................ 220/203.24 |
| 4,235,186 A | | 11/1980 | Frobose |
| 4,279,355 A * | | 7/1981 | Schwartz et al. ........ 220/300 |
| 4,749,093 A * | | 6/1988 | Trick ................. 215/220 |
| 4,811,600 A * | | 3/1989 | Robitaille ............. 73/272 R |
| 5,567,883 A * | | 10/1996 | Nara .................... 73/741 |
| 5,636,758 A * | | 6/1997 | Su ..................... 220/3.8 |
| 5,915,056 A * | | 6/1999 | Bradley et al. .......... 385/76 |
| 5,954,044 A * | | 9/1999 | Schmidt et al. .......... 126/38 |
| 6,053,043 A | | 4/2000 | Dannenberg et al. |
| 6,094,983 A * | | 8/2000 | Pearl ................... 73/431 |
| 6,318,173 B1 * | | 11/2001 | Pearl ................... 73/431 |
| 6,318,683 B1 * | | 11/2001 | Savoy ................. 248/146 |
| 7,017,782 B2 | | 3/2006 | Harrold |
| 2004/0079765 A1* | | 4/2004 | Gallo, Jr. et al. ....... 222/153.14 |
| 2008/0110906 A1* | | 5/2008 | Thompson ............. 220/663 |

* cited by examiner

*Primary Examiner*—David A. Rogers
(74) *Attorney, Agent, or Firm*—Barnes & Thornburg LLP

(57) ABSTRACT

An enclosure for a gage including a housing and cover. The cover includes one or more mounting lugs and the housing includes one or more mounting mechanisms. Each mounting mechanism includes an inclined ramp to facilitate removal of the cover from the housing by rotational movement of the cover with respect to the housing.

19 Claims, 5 Drawing Sheets

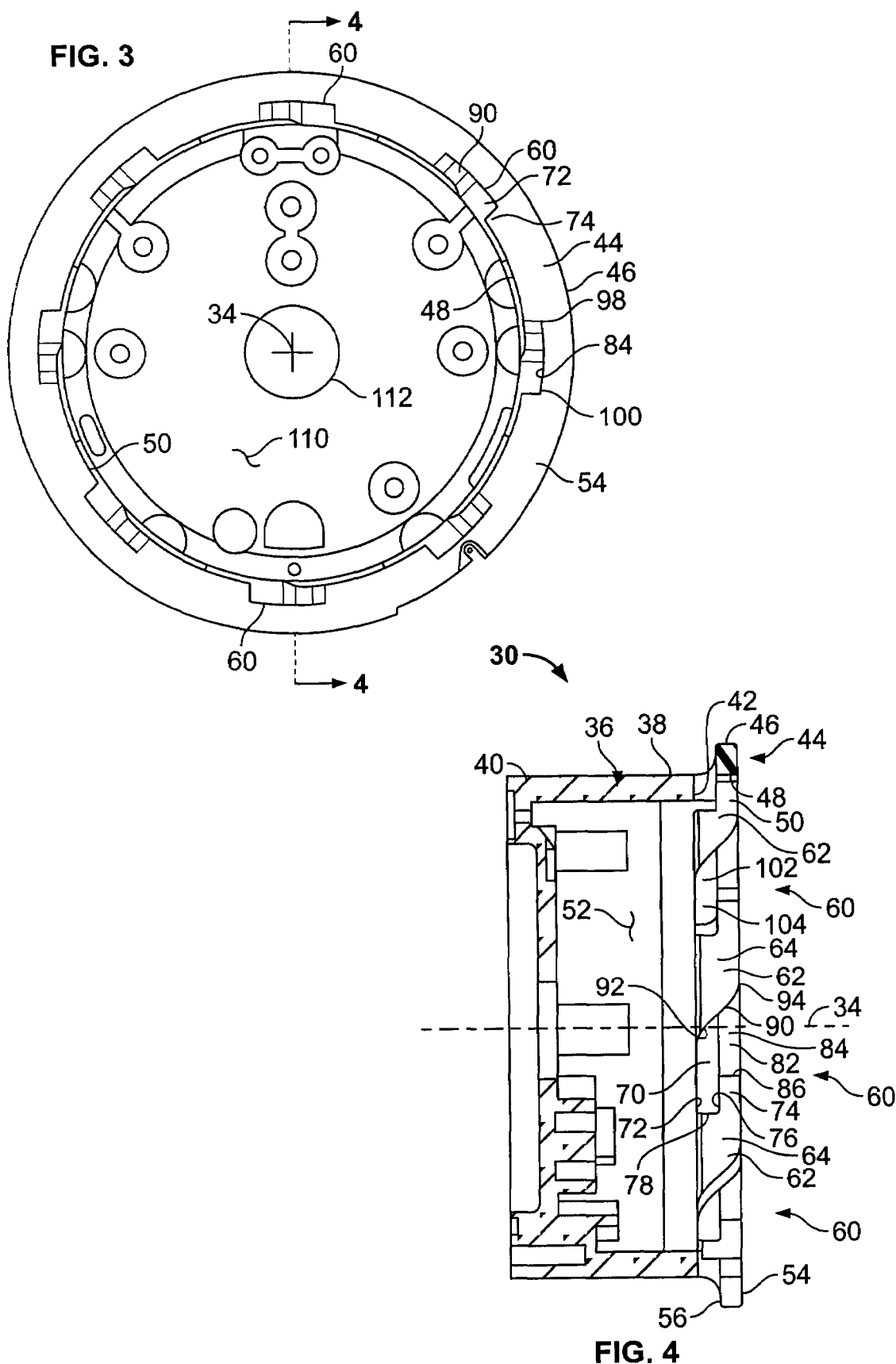

GAGE ENCLOSURE WITH COVER REMOVAL MECHANISM

BACKGROUND

The present disclosure is directed to an enclosure for a gage, and in particular to a gage enclosure including a cover and a housing having a cover removal mechanism.

Gages, for example, pressure gages and temperature gages, include enclosures that contain the operating mechanism of the gage. Gage enclosures often include a housing that is adapted to be mounted to a panel and a cover that is removably attached to the housing. It is desirable to be able to remove the cover from the housing to enable the inspection, adjustment, maintenance or replacement of the gage operating mechanism. However, it is often difficult to manually remove the cover from the housing solely by hand without the use of any tools.

SUMMARY

An enclosure for a gage comprising a housing and cover. The housing includes a peripheral side wall having a first end and a second end and a central longitudinal axis. The first end of the side wall includes a peripheral edge, and a rim attached to the edge of the side wall by one or more mounting mechanisms. The rim includes a opening, an inner surface and an outer surface. Each mounting mechanism includes a first post and a second post extending between the edge of the side wall and the rim. An elongate radial slot extends between the first post and the second post and forms a bottom surface. A longitudinal slot extends between the first post and the second post. The longitudinal slot is in communication with the radial slot. The longitudinal slot includes an opening in the outer surface of the rim. The first post includes an inclined ramp extending between the bottom surface of the mounting mechanism toward the outer surface of the rim. The second post includes an overhang extending over and spaced apart from the bottom surface. The cover includes a generally cylindrical mounting member adapted to be removably received within the opening of the housing. The mounting member includes one or more outwardly extending mounting lugs. Each lug is adapted to be received in a respective longitudinal slot of a mounting mechanism.

The cover is adapted to be coupled to the housing by inserting each mounting lug through the longitudinal slot and into the radial slot of a respective mounting mechanism of the housing then and rotating the cover and the mounting lugs in a first rotational direction with respect to the housing. Each mounting lug is thereby located between the bottom surface and the overhang of the mounting mechanism such that the overhang prevents movement of the cover outwardly from the housing along the central axis of the housing. The cover is adapted to be removed from the housing by rotating the cover in a second rotational direction with respect to the housing such that the mounting lugs move generally parallel to the bottom surfaces of the mounting mechanisms until the mounting lugs engage the ramps whereupon further rotational movement of the cover slides the lugs along the ramps such that the cover moves outwardly away from the housing along the central axis as the lugs slide along the ramps.

BRIEF DESCRIPTION OF THE DRAWING FIGURES

FIG. 3 is a top view of the housing taken along line 3-3 of FIG. 2.

FIG. 4 is a cross sectional view of the housing taken along line 4-4 of FIG. 3.

Figure 12:
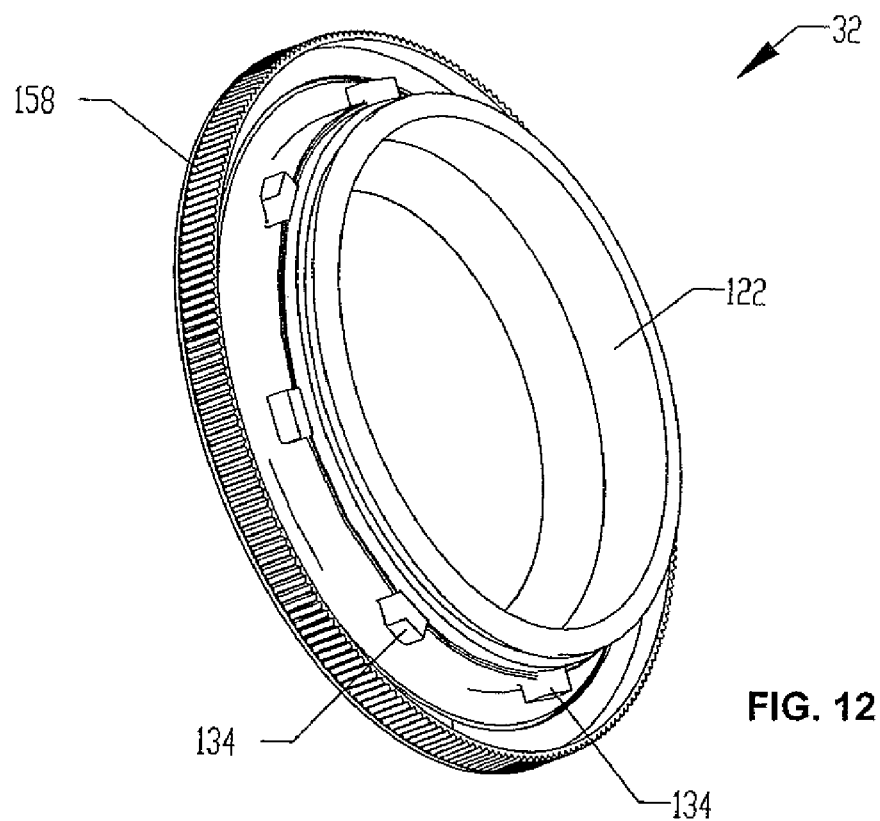

FIG. 12. is a perspective view of the cover.

DETAILED DESCRIPTION

Figure 1:
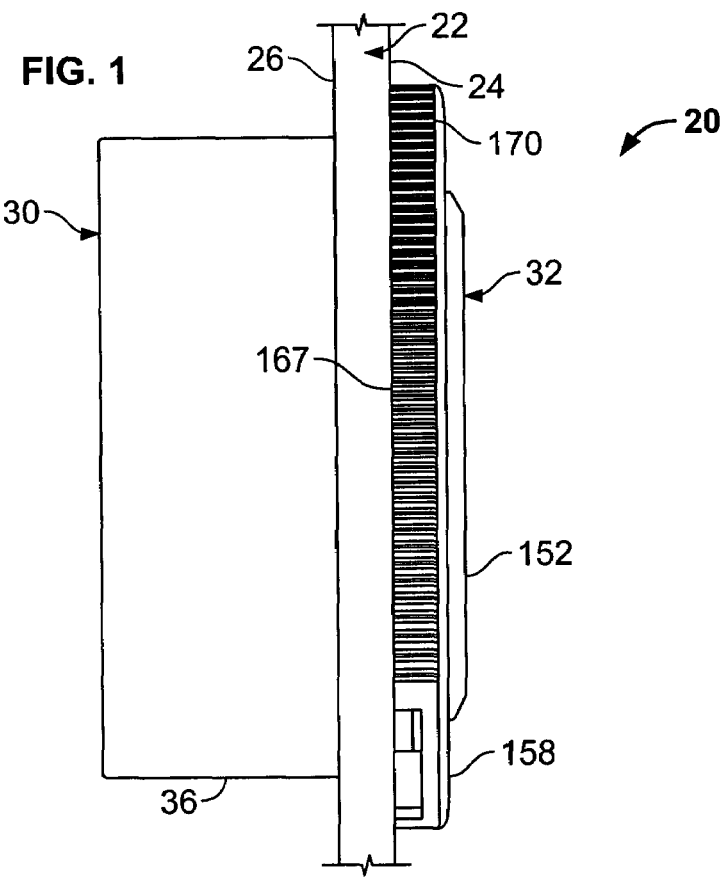
FIG. 1 is a side elevational view of the gage enclosure of the present disclosure shown mounted to a panel.
Figure 2:
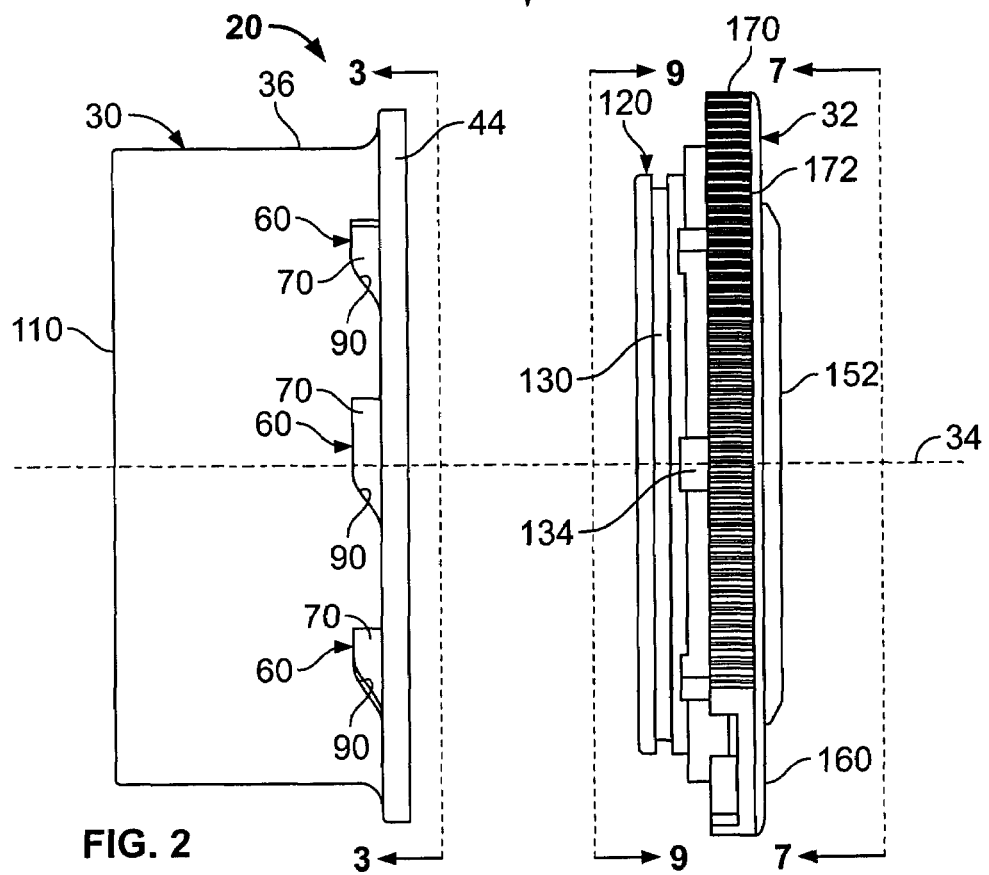
FIG. 2 is an side elevational view of the enclosure shown with the cover removed from the housing.
Figure 5:
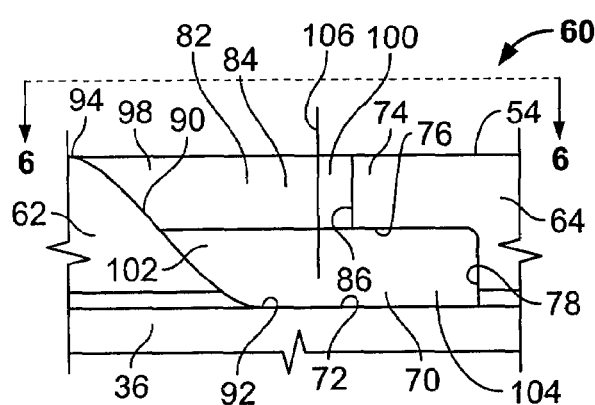
FIG. 5 is a side elevational view of a cover removal mechanism.
Figure 6:
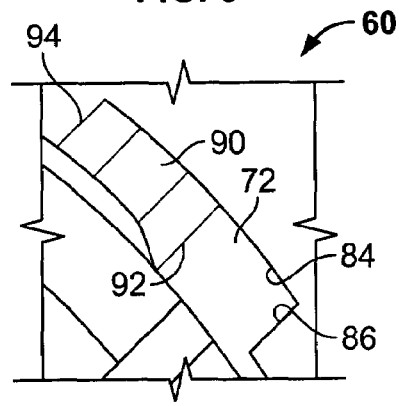
FIG. 6 is a top view of the cover removal mechanism taken along line 6-6 of FIG. 5.

An embodiment of the enclosure 20 for a gage is shown in FIG. 1 mounted to a panel 22. The panel 22 includes a generally planar exterior surface 24 and a spaced apart generally parallel and planar interior surface 26. The enclosure 20 is adapted to receive and contain the operating mechanism of a gage, such as for example, a pressure gage, temperature gage or other indicating gage. The enclosure 20 includes a housing 30 and a cover 32. As shown in FIGS. 3 and 4, the housing 30 includes a generally linear central longitudinal axis 34 and a generally circular and cylindrical peripheral side wall 36 that extends concentrically about the central axis 34. The side wall 36 extends between a first end 38 and a second end 40. The side wall 36 includes a generally circular peripheral edge 42 at the first end 38. A generally circular and annular rim 44 is attached to the edge 42 and first end 38 of the side wall 36. The rim 44 extends generally concentrically about the central axis 34. The rim 44 includes a generally circular outer edge 46 and a generally circular inner edge 48, each of which are generally concentric about the central axis 34. An opening 50 is formed by the inner edge 48 of the rim 44 that is in communication with a chamber 52 formed within the housing 30 by the side wall 36. The rim 44 includes a generally planar outer surface 54 and a spaced apart and generally parallel planar inner surface 56.

The rim 44 is attached to the edge 42 at the first end 38 of the side wall 36 by one or more mounting mechanisms 60. Each mounting mechanism 60 includes a first post 62 and a second post 64. Each post 62 and 64 extends from the edge 42 at the first end 38 of the side wall 36 to the inner surface 56 of the rim 44. The first post 62 of each mounting mechanism may be attached to and formed integrally with the second post 64 of an adjacent mounting mechanism 60. The mounting mechanisms 60 are spaced apart from one another along the perimeter of the side wall 36 generally equidistantly and uniformly about the central axis 34. Each mounting mechanism 60 includes an elongate radial slot 70 that extends along the side wall 36 between a first post 62 and second post 64. The radial slot 70 forms a bottom surface 72 that is generally planar and that extends along the first end 38 of the side wall 36. The bottom surface 72 of the radial slot 70 may be formed as part of the edge 42 of the side wall 36. The radial slot 70 also forms an overhang 74 in the second post 64 having an engagement surface 76 that is generally parallel to and spaced apart from the bottom surface 72. The radial slot 70 also forms an end wall 78 at the second post 64 that extends generally perpendicularly between the bottom surface 72 and engagement surface 76. If desired, the radial slot 70 may extend radially outwardly from the central axis 34 through the housing 30.

Each mounting mechanism 60 also includes a longitudinal slot 82 that extends between the first post 62 and the second post 64. The longitudinal slot 82 also extends inwardly from the outer surface 54 of the rim 44 toward the side wall 36 and is in communication with the radial slot 70. The longitudinal slot 82 forms a side wall 84 that extends from the overhang 74 of the second post 64 to the first post 62. The side wall 84 extends from the inner surface 56 to the outer surface 54 of the rim 44. The side wall 84 is generally parallel to the outer edge 46 of the rim 44. The longitudinal slot 82 also forms an end wall 86 that extends from the side wall 84 to the inner edge 48 of the rim 44. The end wall 86 forms an outer end of the overhang 74.

Each mounting mechanism 60 also includes a cover removal mechanism such as an inclined ramp 90. The ramp 90 includes a first end 92 located adjacent the bottom surface 72 and a second end 94 located adjacent the outer surface 54 of the rim 44. The ramp 90 includes a surface that extends from the first end 92 to the second end 94 and that may be inclined with respect to the bottom surface 72 at an angle of approximately forty-five degrees, although other angles of inclination may be used. The first end 92 of the ramp 90 may include a generally concavely curved surface portion that extends outwardly from the bottom surface 72 toward the second end 94. The second end 94 of the ramp 90 may include a generally convexly curved surface portion that extends inwardly from the outer surface 54 of the rim 44 toward the first end 92. If desired, the ramp 90 need not extend all the way to the outer surface 54 of the rim 44, and the second end 94 of the ramp 90 may be located adjacent to but spaced apart from the outer surface 54 of the rim 44.

The longitudinal slot 82 includes a first end 98 located adjacent the second end 94 of the ramp 90 and a second end 100 located adjacent the end wall 86 of the overhang 74. The radial slot 70 includes a first end 102 located adjacent the first end 92 of the ramp 90 and a second end 104 located adjacent the second post 64. The end wall 86 of the overhang 74 is spaced apart from the first end 92 of the ramp 90 such that the second end 100 of the longitudinal slot 82 is located in longitudinal alignment with the radial slot 70 and the bottom surface 72. A passageway 106 is thereby formed generally parallel to the central axis 34 that extends from the bottom surface 76 to the opening formed in the outer surface 54 of the rim 44 by the longitudinal slot 82.

The housing 30 also includes an end wall 110. The end wall 110 is attached to and along the second end 40 of the side wall 36 and is generally perpendicular to the side wall 36 and central axis 34. The end wall 110 includes a central aperture 112 in communication with the chamber 52 that is located concentrically about the central axis 34. The housing 30 may be integrally formed from a plastic material. The chamber 52 is adapted to receive the operating mechanism of a gage.

Figure 7:
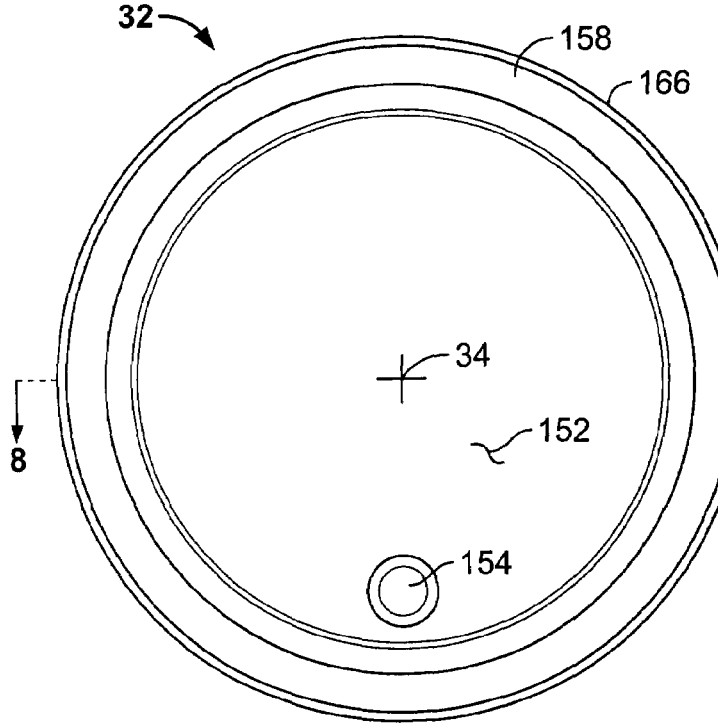
FIG. 7 is a front view of the cover taken along line 7-7 of FIG. 2.
Figure 8:
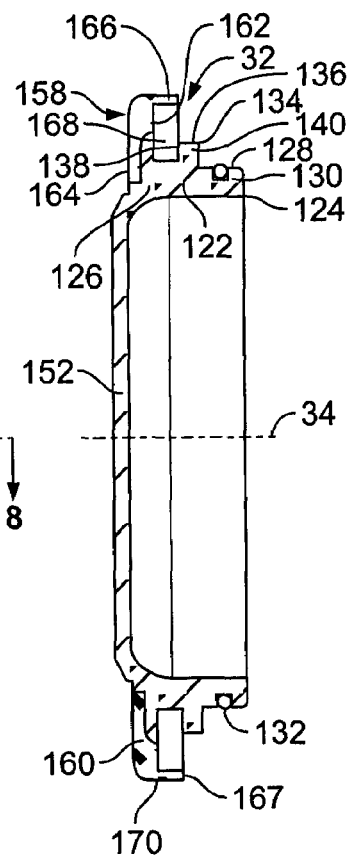
FIG. 8 is a cross sectional view of the cover taken along line 8-8 of FIG. 7.
Figure 9:
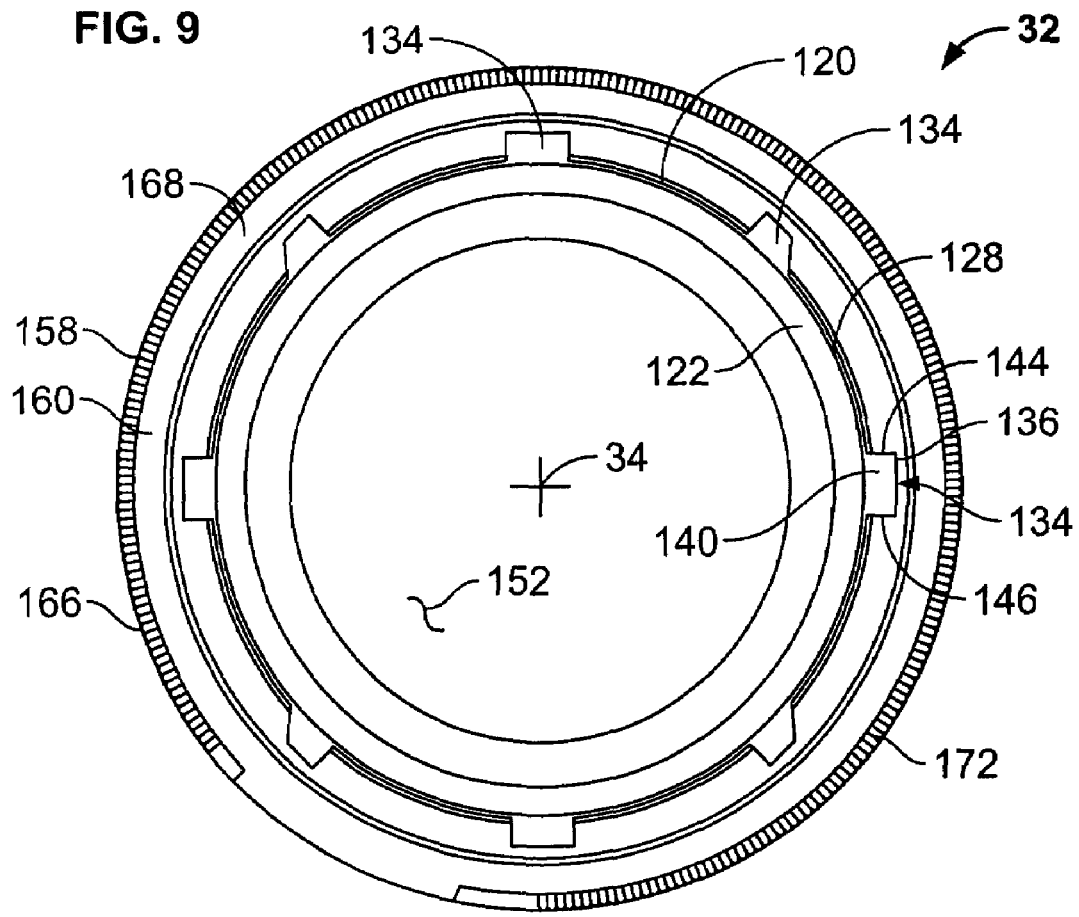
FIG. 9 is a rear view of the cover taken along line 9-9 of FIG. 2.
Figure 10:
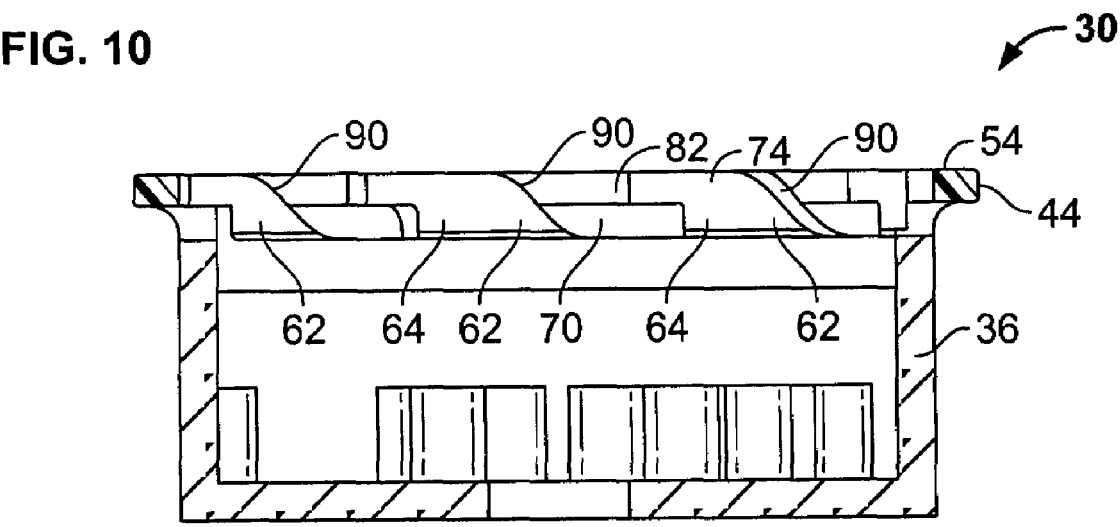
FIG. 10 is a cross sectional view of the housing.
Figure 11:
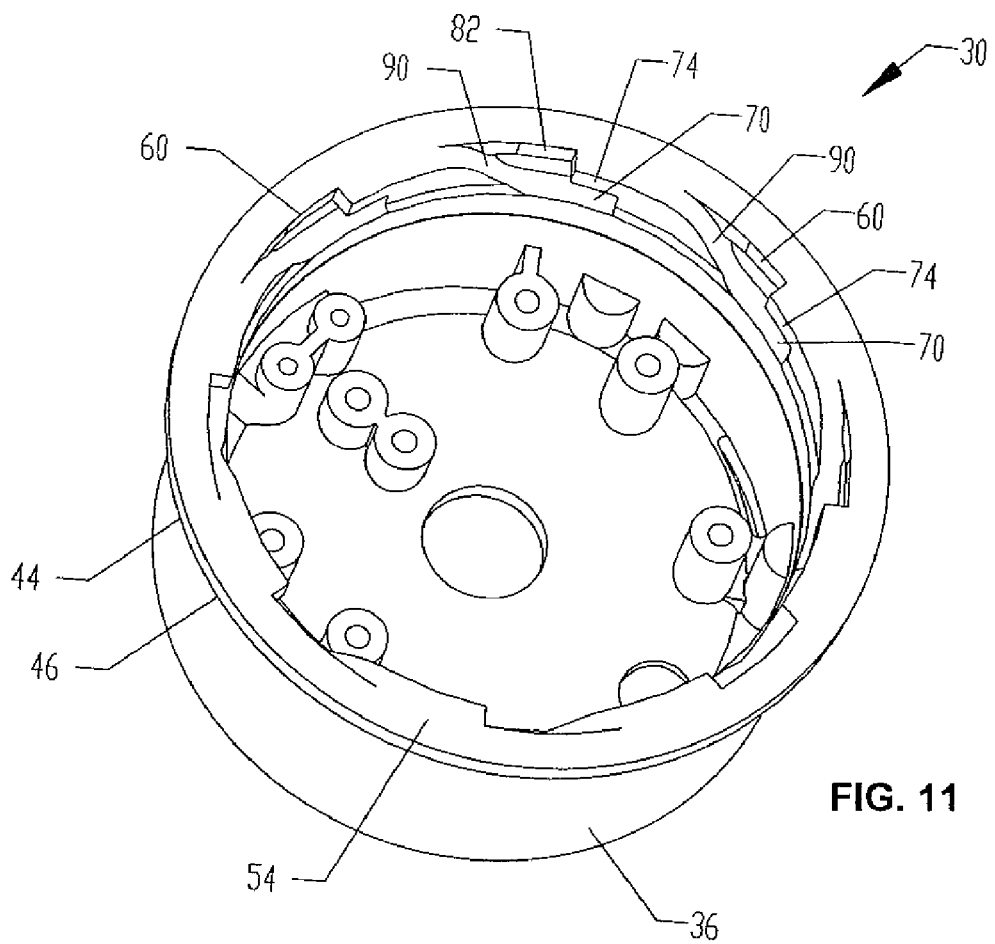
FIG. 11 is perspective view of the housing.

The cover 32, as shown in FIGS. 7-9, includes a generally cylindrical mounting member 120. The mounting member 120 includes a generally circular and cylindrical side wall 122. The side wall 122 extends from a first end 124 to a second end 126 and includes an outer surface 128. A circumferential groove 130 is located in the outer surface 128 of the side wall 122 and extends around the side wall 122. A resilient elastomeric seal member 132, such as for example, an O-ring, is located within the groove 130 and extends around the side wall 122 and outwardly beyond the outer surface 128 of the side wall 122. The mounting member 120 also includes one or more mounting lugs 134, and may include one mounting lug 134 for each mounting mechanism 60 of the housing 30. The mounting member 120 may include fewer mounting lugs 134 than the number of mounting mechanisms 60 included in the housing 30, if desired. Each mounting lug 134 extends outwardly from the outer surface 128 of the side wall 122 to an outer end 136. Each mounting lug 134 also includes a generally planar top surface 138 and a generally planar bottom surface 140 that is generally parallel to the top surface 138. Each mounting lug 134 also includes a first side wall 144 and a spaced apart second side wall 146 that extend outwardly from the outer surface 128 of the side wall 122 to the outer end 136 of the mounting lug 134. The first side wall 144 and/or the second side wall 146 may be generally parallel to a radius from the central axis 34 or inclined at an angle to a radius from the central axis 34.

The cover 32 also includes a generally circular bezel 152 attached along its perimeter to the second end 126 of the side wall 122 of the mounting member 120. The bezel 152 is adapted to be located generally perpendicular to and concentrically about the axis 34. The bezel 152 may be formed from a clear or translucent material such that an indicator of the gage operating mechanism may be viewed through the bezel 152. If desired, the bezel 152 may include an aperture 154 to provide external access to the operating mechanism of the gage, such as for example to zero the indicator of the gage operating mechanism.

The cover 32 also includes an annular collar 158 that extends around and outwardly from the second end 126 of the side wall 122 and the bezel 152. The collar 158 includes a generally circular and annular flange 160 that extends outwardly from the second end 126 of the side wall 122. The flange 160 includes an annular inner surface 162 and a spaced apart annular outer surface 164. The collar 158 also includes an annular sleeve 166 attached to the circular outer end of the flange 160. The sleeve 166 extends along the outer edge of the flange 160 generally concentrically about the central axis of the cover 32. The sleeve 166 extends from the outer end of the flange 160 generally parallel to the side wall 122 to a generally circular tip 167 in a direction generally from the second end 126 toward the first end 124 of the side wall 122. The generally circular tip 167 of the sleeve 166 is located generally coplanar with the top surfaces 138 of the mounting lugs 134. The collar 158 includes a generally annular receptacle 168 located between the sleeve 166 and the side wall 122 and between the flange 160 and the top surfaces 138 of the mounting lugs 134. The receptacle 168 is adapted to receive the rim 44 of the housing 30. The collar 158 includes a generally cylindrical side wall 170 formed by the sleeve 166 and the outer end of the flange 160 that extends from the edge 167 of the sleeve 166 to the outer surface 164 of the flange 160. The length of the side wall 170 in a direction generally parallel to the central axis of the cover 32 is relatively short, such as for example, approximately 0.200 inches. The outer surface of the side wall 170 may include a plurality of gripping members 172, such as for example raised ridges, which may be located around the circumference of the side wall 170.

As shown in FIG. 1, when the housing 30 is mounted to the panel 22, and the cover 32 is coupled to the housing 30, the tip 167 of the collar 158 is located closely adjacent to the exterior surface 24 of the panel 22. The panel 22 thereby inhibits the extent to which the fingers of a user can grip the side wall 170 of the cover 32 when it is desired to remove the cover 32 from the housing 30. Due to the relatively short height of the side wall 170, and the interference of the panel 22, generally only the finger tips of the user are capable of engaging the side wall 170 of the cover 32.

When the cover 32 is coupled to the housing 30 in a closed position as shown in FIG. 1, each mounting lug 134 of the cover 32 is located within a respective mounting mechanism 60. The mounting lug 134 extends into the radial slot 70 with the top surface 138 of the mounting lug 134 located closely adjacent the engagement surface 76 of the overhang 74, and the bottom surface 140 of the mounting lug 134 located closely adjacent to the bottom surface 72. The first side wall 144 of the mounting lug 134 is located closely adjacent to the end wall 78 formed by the radial slot 70. The seal member 132 is in sealing engagement with the interior surface of the side wall 36 of the housing 30 thereby creating a seal between the cover 32 and housing 30. Movement of the cover 32 away from the housing 30 in a linear longitudinal direction along the central axis 34 is prevented by engagement of the mounting lugs 134 of the cover 32 with the engagement surfaces 76 of the overhangs 74 of the mounting mechanisms 60 in the housing 30.

When it is desired to remove the cover 32 from the housing 30, the gripping members 172 of the side wall 170 may be gripped with the fingertips of a user. The cover 32 is rotated about the central axis 34 in a first generally counter-clockwise direction as viewed in FIG. 7. As the cover 32 rotates in the first rotational direction with respect to the housing 30, the mounting lugs 134 slide from the second end 104 toward the first end 102 of the radial slot 70, generally parallel to the bottom surface 72 and transversely with respect to the central axis 34, until the mounting lugs 134 and cover 32 are located in an open position. When the cover is in the open position, each mounting lug 134 is located adjacent the bottom surface 72, has not yet slid along the ramp 90, and is no longer located between the bottom surface 72 and the engagement surface 76 of the overhang 74, but is instead located beneath the second end 100 of the longitudinal slot 82 in the passageway 106.

When the cover 32 is in the open position with respect to the housing 30, the cover 32 can be removed from the housing 30 by moving the cover 32 away from the housing 30 in a linear longitudinal direction along the axis 34 such that the mounting lugs 134 pass through the longitudinal slots 82 of the mounting mechanisms 60 along the passageways 106. However, when the cover 32 is in the open position, although the overhang 74 of each mounting mechanism 60 does not prevent longitudinal movement of the cover 32, the resilient seal member 32 grips the cover 32 in engagement with the side wall 36 of the housing 30 such that the seal member 132 provides a retention force that must be overcome in order to move the cover 32 along the central longitudinal axis 34 with respect to the housing 30. Due to the relatively short height of the side wall 170 of the cover 32, it is difficult to obtain a sufficient grip on the cover 32 with the fingertips of the user to overcome the gripping force provided by the seal member 132 without the use of any tools, such as a screw driver, to pry the cover 32 away from the housing 30 along the axis 34.

When the user is not able to easily overcome the retention force provided by the seal member 32 to remove the cover 32 along the passageway 106 without the use of any tool, the user can continue to rotate the cover 32 with respect to the housing 30 in the first rotational direction from the open position. Such further rotation of the cover 32 with respect to the housing 30 rotates the mounting lugs 134 into engagement with the concavely curved portion of the ramps 90 at the first end 92. Further rotation of the cover 32 with respect to the housing 30 in the first rotational direction slides each mounting lug 134 along the surface of the ramp 90 toward the second end 94 of the ramp 90. As the mounting lugs 134 slide along the inclined ramps 90, the cover 32 simultaneously rotates in the first direction about the central axis 34 and also conjointly moves outwardly away from the housing 30 in a generally linear direction along the central axis 34 while overcoming the retention force provided by the seal member 32 due to the mechanical advantage provided by the inclined ramps 90. Continued rotation of the cover 32 in the first rotational direction with respect to the housing 30 rotates the mounting lugs 134 to the convexly curved portion of the ramp 90 at the second end 94 and thereafter to the outer surface 54 of the rim 44 of the housing 30 such that the cover 32 is removed from the housing 30.

The cover 32 may be coupled to the housing 30 in a reverse manner by sliding the mounting lugs 134 downwardly along the inclined ramps 90 by rotation of the cover 32 in a second clock-wise rotational direction about the central axis 34 as viewed in FIG. 7, while also applying a longitudinal force to the cover 32 along the axis 34 to press the cover 32 into engagement with the housing 30. Alternatively, the mounting lugs 134 may initially be moved in a longitudinal direction generally parallel to the central axis 34 along the passageways 106 through the second end 100 of the longitudinal slots 82 until the mounting lugs 134 engage the bottom surfaces 72, whereupon the cover 32 is in the open position with respect to the housing 30. The seal member 132 also inhibits coupling of the cover 32 to the housing 30, but the inhibiting force provided by the seal member 132 can be relatively easily overcome by the user pressing on the cover 32 along the axis 34. Once the cover 32 is in the open position with respect to the housing 30, a user can grip the side wall 170 with fingertips and continue rotating the cover 32 in the second rotational direction to rotate the mounting lugs 134 in the second end 104 of the radial slot 70 between the bottom surface 72 and the engagement surface 76 of the overhang 74 to place the cover 32 in the closed position. Consequently, the cover 32 can be attached to and removed from the housing 30 by hand only, and without the use of any tools, due to the mechanical advantage provided by the inclined ramps 90 in overcoming the retention force provided by the seal member.

Various features of the invention have been particularly shown and described in connection with the illustrated embodiment of the invention, however, it must be understood that these particular arrangements merely illustrate, and that the invention is to be given its fullest interpretation within the terms of the appended claims.

What is claimed is:

1. An enclosure for a gage, said enclosure comprising:
a housing including a peripheral side wall having a first end and a second end and a central longitudinal axis, and a rim attached to said first end of said side wall by one or more mounting mechanisms, said rim including a opening, an inner surface and an outer surface, each said mounting mechanism including a first post and a second post extending between said first end of said side wall and said rim, an elongate radial slot extending between said first post and said second post defining a bottom surface, and a longitudinal slot extending between said first post and said second post, said longitudinal slot being in communication with said radial slot, said longitudinal slot defining an opening in said outer surface of said rim, said first post including an inclined ramp extending from said bottom surface of said mounting mechanism toward said outer surface of said rim, said second post including an overhang extending over and spaced apart from said bottom surface, each said mounting mechanism including a longitudinal passageway extending from said bottom surface of said mounting mechanism through said longitudinal slot, said passageway extending generally linearly and generally parallel to said central axis of said housing; and a cover including a mounting member adapted to be removably received within said opening of said housing, said mounting member including one or more outwardly extending mounting lugs, each said lug adapted to be received in a respective radial slot of a mounting mechanism;

whereby said cover is adapted to be removed from said housing by rotating said cover in a rotational direction with respect to said housing about said central axis such that said mounting lugs are respectively located in said passageways whereupon each said mounting lug is adapted to pass through a respective passageway as said cover is moved away from said housing along said central axis or by rotating said cover in a rotational direction with respect to said housing about said central axis until said mounting lugs engage said ramps whereupon further rotational movement of said cover slides said lugs along said ramps such that said cover moves outwardly away from said housing along said central axis as said lugs slide along said ramps.

2. The enclosure of claim 1 wherein each said inclined ramp extends from said bottom surface of said mounting mechanism to said outer surface of said rim.

3. The enclosure of claim 1 wherein each said inclined ramp includes a first end and a second end, said first end of said ramp including a generally concavely curved surface portion and said second end of said ramp including a generally convexly curved surface portion.

4. The enclosure of claim 1 wherein at least a portion of said longitudinal slot of each said mounting mechanism is in longitudinal alignment with at least a portion of said bottom surface of said mounting mechanism.

5. The enclosure of claim 1 wherein said first post of a first mounting mechanism is attached to a second post of an adjacent second mounting mechanism.

6. The enclosure of claim 1 wherein said overhang of each said second post includes a generally planar engagement surface that is generally parallel to said bottom surface of said mounting mechanism.

7. The enclosure of claim 1 wherein said peripheral sidewall of said housing is generally circular and said rim of said housing is generally circular.

8. The enclosure of claim 1 wherein said housing includes an end wall attached to said second end of said side wall of said housing.

9. The enclosure of claim 1 wherein said rim of said housing includes an inner edge and an outer edge, said longitudinal slot of each said locking mechanism extending through said inner edge of said rim.

10. The enclosure of claim 1 wherein said housing includes a plurality of mounting mechanisms, said mounting mechanisms being generally equally spaced from one another along said side wall of said housing and around said central axis.

11. The enclosure of claim 1 wherein said cover includes a seal member extending around said mounting member of said cover.

12. The enclosure of claim 1 wherein each said mounting lug of said cover includes a generally planar lop surface and a generally planar bottom surface.

13. An enclosure for a gage, said enclosure comprising:

a housing including a peripheral side wall having a first end and a second end and a central longitudinal axis, and a rim attached to said first end of said side wall by one or more mounting mechanisms, said rim including a opening, an inner surface and an outer surface, each said mounting mechanism including a first post and a second post extending between said first end of said side wall and said rim, an elongate radial slot extending between said first post and said second post defining a bottom surface, and a longitudinal slot extending between said first post and said second post, said longitudinal slot being in communication with said radial slot, said longitudinal slot defining an opening in said outer surface of said rim, said first post including an inclined ramp extending from said bottom surface of said mounting mechanism toward said outer surface of said rim, said second post including an overhang extending over and spaced apart from said bottom surface; and a cover including a mounting member adapted to be removably received within said opening of said housing, said mounting member including one or more outwardly extending mounting Jugs, each said lug adapted to be received in a respective radial slot of a mounting mechanism, said cover including an annular collar extending outwardly from said mounting member, said annular collar including a peripheral side wall, said side wall of said annular collar forming an annular receptacle extending around said mounting member, said receptacle adapted to receive said Pm of said housing;

whereby said cover is adapted to be removed from said housing by rotating said cover in a rotational direction with respect to said housing about said central axis such that said mounting lugs move generally parallel to said bottom surfaces of said mounting mechanisms until said mounting lugs engage said ramps whereupon further rotational movement of said cover slides said lugs along said ramps such that said cover moves outwardly away from said housing along said central axis as said lugs slide along said ramps.

14. The enclosure of claim 13 wherein said side wall of said annular collar of said cover includes a plurality of gripping members.

15. The enclosure of claim 1 wherein said side wall of said cover extends generally from said outer surface of said rim of said housing to generally adjacent said inner surface of said rim of said housing when said cover is coupled to said housing.

16. The enclosure of claim 13 wherein said cover includes a bezel, said annular collar extending around said bezel, said bezel being generally translucent.

17. An enclosure for a gage, said enclosure comprising:

a housing including a peripheral first side wall having a first end and a second end and a central longitudinal axis, and a rim attached to said first end of said first side wall by one or more mounting mechanisms, said rim including a opening, an inner surface and an outer surface, each said mounting mechanism including a first post and a second post extending between said first end of said first side wall and said rim, an elongate radial slot extending between said first post and said second post defining a bottom surface, and a longitudinal slot extending between said first post and said second post, said longitudinal slot being in communication with said radial slot, said longitudinal slot defining an opening in said outer surface of said rim and forming a second side wall that extends from said inner surface to said outer surface of said rim, said first post including an inclined ramp extending from said bottom surface of said mounting mechanism toward said outer surface of said rim, said second post including an overhang extending over and spaced apart from said bottom surface, said second side wall extending from adjacent said overhang toward said first post; and a cover including a mounting member adapted to be removably received within said opening of said housing, said mounting member including one or more outwardly extending mounting lugs, each said lug adapted to be received in a respective radial slot of a mounting mechanism;

whereby said cover is adapted to be removed from said housing by rotating said cover in a rotational direction with respect to said housing about said central axis such that said mounting lugs move generally parallel to said bottom surfaces of said mounting mechanisms until said mounting lugs engage said ramps whereupon further rotational movement of said cover slides said lugs along said ramps such that said cover moves outwardly away from said housing along said central axis as said lugs slide along said ramps.

18. The enclosure of claim 17 wherein said longitudinal slot forms an end wall that extends from said second side wall to an inner edge of said rim, said end wall forming an outer end of said overhang.

19. An enclosure for a gage, said enclosure comprising:

a housing including a peripheral side wall having a first end and a second end and a central longitudinal axis, and a rim attached to said first end of said side wall by one or more mounting mechanisms, said rim including an opening, an inner surface and an outer surface, each said mounting mechanism including a first post and a second post extending between said first end of said side wall and said rim, an elongate radial slot extending between said first post and said second post defining a bottom surface, and a longitudinal slot extending between said first post and said second post, said longitudinal slot being in communication with said radial slot, said longitudinal slot defining an opening in said outer surface of said rim, said first post including an inclined ramp extending from said bottom surface of said mounting mechanism toward said outer surface of said rim, said inclined ramp including a first end and a second end, said first end of said ramp including a generally concavely curved surface portion and said second end of said ramp including a generally convexly curved surface portion, said second post including an overhang extending over and spaced apart from said bottom surface; and a cover including a mounting member adapted to be removably received within said opening of said housing, said mounting member including one or more outwardly extending mounting Jugs, each said lug adapted to be received in a respective radial slot of a mounting mechanism;

whereby said cover is adapted to be removed from said housing by rotating said cover in a rotational direction with respect to said housing about said central axis such that said mounting lugs move generally parallel to said bottom surfaces of said mounting mechanisms until said mounting lugs engage said inclined ramps whereupon further rotational movement of said cover moves said cover outwardly away from said housing along said central axis as said cover rotates about said central axis.

* * * * *

UNITED STATES PATENT AND TRADEMARK OFFICE
CERTIFICATE OF CORRECTION

PATENT NO.       : 7,600,427 B2                                                      Page 1 of 1
APPLICATION NO.  : 11/851515
DATED            : October 13, 2009
INVENTOR(S)      : Palmer et al.

It is certified that error appears in the above-identified patent and that said Letters Patent is hereby corrected as shown below:

In claim 13, column 8, line 17, delete "Jugs" and insert -- lugs --.

In claim 13, column 8, line 24, delete "Pm" and insert -- rim --.

In claim 15, column 8, line 38, delete "1" and insert -- 13 --.

In claim 19, column 10, line 19, delete "Jugs" and insert -- lugs --.

Signed and Sealed this

First Day of June, 2010

David J. Kappos
*Director of the United States Patent and Trademark Office*